United States Patent [19]

D'Hont

[11] Patent Number: 4,652,601
[45] Date of Patent: Mar. 24, 1987

[54] RUBBER-REINFORCED STYRENIC POLYMER RESINS EXHIBITING INCREASED ELONGATION

[75] Inventor: Yvan R. D'Hont, Kan. Duhamellaan, Belgium

[73] Assignee: The Dow Chemical Company, Midland, Mich.

[21] Appl. No.: 793,805

[22] Filed: Nov. 1, 1985

[30] Foreign Application Priority Data

Nov. 12, 1984 [NL] Netherlands ............... 59-8403453

[51] Int. Cl.$^4$ .............................................. C08K 5/11
[52] U.S. Cl. .................................................. 524/314
[58] Field of Search ........................................ 524/314

[56] References Cited

U.S. PATENT DOCUMENTS 3,224,994  12/1965  Lundberg et al. ............... 524/314
4,307,134  12/1981  Milkovich et al. ............... 521/57

FOREIGN PATENT DOCUMENTS 0766528  11/1971  Belgium ............................ 524/314
 777780   6/1957  United Kingdom ............... 524/314
1090932  11/1967  United Kingdom ............... 524/314

*Primary Examiner*—Joseph L. Schofer
*Assistant Examiner*—N. Sarofim
*Attorney, Agent, or Firm*—Dragan J. Karadzic

[57] ABSTRACT

The elongation of a rubber-reinforced styrenic polymer is increased by the addition of a small amount of an aliphatic diester such as dioctyl adipate to the rubber-reinforced styrenic polymer. The unexpected increase in elongation is particularly noticable at higher pulling speeds.

12 Claims, No Drawings

RUBBER-REINFORCED STYRENIC POLYMER RESINS EXHIBITING INCREASED ELONGATION

BACKGROUND OF THE INVENTION

The present invention relates to a rubber-reinforced styrenic polymer exhibiting increased elongation, in particular, to a mixture of a rubber-reinforced styrenic polymer and an aliphatic diester and to a method for preparing the mixture.

Due to their physical and chemical properties, rubber-reinforced polymer resins derived from a monovinylidene aromatic compound such as styrene or a derivative of styrene, and optionally, one or more comonomers, are employed in a variety of commercial applications such as packaging, refrigerator linings, automotive parts, furniture, castings for domestic appliances and toys. In general, the rubber-reinforced polymers comprise discrete particles of rubber, e.g., cross-linked polybutadiene or a block copolymer of butadiene and styrene, dispersed throughout a continuous polymer matrix phase derived from styrene (conventionally referred to as high impact polystyrene or HIPS) or styrene and a comonomer such as acrylonitrile (conventionally referred to as ABS).

The mechanism by which a material fails and the type of failure is known to be dependent on the physical properties of the material. For example, materials possessing high elongations will generally fail in a ductile type manner. Ductile failure is a failure accompanied by deformation prior to break and is conventionally evidenced by a fracture or break without formation of splinters. Alternatively, materials having relatively lower elongation exhibit a brittle type failure which occurs without significant deformation prior to break as commonly as evidenced by the fracture or break being splintered. For this reason, a brittle type failure is less desirable than a ductile fracture in most applications.

In view of these differences in failure mechanisms resulting, to a large extent, from differences in elongation of a material, for many end-use applications it is often desirable to increase the elongation of the material.

The elongation of a material is normally considered to be the elongation at break expressed as a percentage of the original elongation. Elongation of the rubber-reinforced styrenic polymers is conventionally determined using standard tensile property testing techniques which involve pulling a dumb bell shaped sample at its two ends until failure. The speed at which this tensile testing is conducted will have a large influence on the properties, particularly elongation properties, measured. It is important that good elongation be maintained at low pulling speeds such as 5 millimeter (mm) per minute (min) as well as high pulling speeds such as 100 mm/min.

Heretofore, one method for increasing the elongation of a rubber-reinforced styrenic polymer involves modifying the composition of the rubber-reinforced polymer such as by increasing the amount of rubber dispersed as discrete particles throughout the continuous polymer matrix phase. Alternatively, the elongation of the rubber-reinforced polymer can also be increased by increasing the average particle size of the disperse rubber phase and/or otherwise modifying the physical or chemical make-up of the rubber-reinforced polymer. Unfortunately, sufficient elongation can only be achieved using these techniques at the expense of one or more other properties of the rubber-reinforced product.

In view of these deficiencies, it remains highly desirable to provide a rubber-reinforced styrenic polymer which exhibits a relatively high elongation at a variety of pulling speeds which elongation is achieved without significantly and deleteriously affecting the other properties of the rubber-reinforced polymer.

SUMMARY OF THE INVENTION

Accordingly, in one aspect, the present invention is a composition comprising a mixture of a rubber-reinforced styrenic polymer resin and an amount of aliphatic diester represented by the general structural formula:

wherein R is a covalent bond or an alkyl group having from 1 to 8 carbon atoms and R is a straight or branched chain alkyl group of from 2 to 18 carbon atoms, the amount of the aliphatic diester being sufficient to increase the elongation of the rubber-reinforced styrenic polymer.

In a second aspect, the present invention is a method for preparing the described mixture.

DETAILED DESCRIPTION OF THE INVENTION

Surprisingly, when small amounts of the aliphatic diester are blended with the rubber-reinforced styrenic polymer resin, the elongation of the styrenic polymer resin is increased significantly. Alternatively, when a rubber-reinforced styrenic polymer resin is blended with the same amounts of mineral oil or dioctyl phthalate, the resulting composition does not exhibit significantly improved elongations. The increased elongation exhibited by the blend of the rubber-reinforced styrenic polymer and aliphatic diester is evidenced at pulling speeds of from 5 mm/min to 100/min with more significant increases in elongation being exhibited at the higher pulling speeds. Moreover, using amounts of the aliphatic diester sufficient to increase elongation, the other properties of the rubber-reinforced styrenic polymer are not significantly and deleteriously affected.

Due to the unexpected increase in elongation of the mixture, the composition of the present invention is particularly useful in the preparation of automotive parts, molded casing for household goods and appliances and other engineering applications.

The rubber-reinforced styrenic polymer resins useful in preparing the compositions of the present invention generally comprise a continuous polymer matrix phase and a dispersed phase of discrete rubber particles.

The polymer matrix phase of the rubber-reinforced styrenic polymer resin is generally derived from one or more monovinylidene aromatic compounds. Representative monovinylidene aromatic compounds include styrene, alkyl-substituted styrenes such as α-alkyl-styrenes (e.g., α-methylstyrene and α-ethylstyrene) and ring-substituted styrenes (e.g., vinyl toluene, particularly p-vinyl toluene, o-ethylstyrene and 2,4-dimethylstyrene); ring-substituted halo styrenes such as chlorostyrene and 2,4-dichlorostyrene; styrene substituted with both a halo and an alkyl group such as 2-chloro-4-methyl styrene and vinylanthracene. In general, the preferred monovinylidene aromatic compound(s) employed in preparing the polymer matrix are a styrene or a combination of styrene and α-methylstyrene (advantageously from 10 to 50, more advantageously from 15 to 40, weight percent of the total weight of the styrene and α-methylstyrene being α-methylstyrene); with styrene being the most preferred monovinylidene aromatic compound.

Optionally, the monovinylidene aromatic compound can be copolymerized with one or more other comonomers to form the polymer matrix phase. Representative of such other comonomers include the unsaturated nitriles such as acrylonitrile, ethacrylonitrile, methacrylonitrile and mixtures thereof, the α,β-ethylenically unsaturated carboxylic acids and esters thereof such as acrylic acid, methacrylic acid, methylacrylate, methylmethacrylate, ethylacrylate and 2-ethylhexylacrylate; the acid anhydrides such as maleic anhydride; the ethylenically unsaturated amides such as acrylamide and methacrylamide; divinyl aromatic compounds such as divinylbenzene; vinylidene chloride; vinylidene bromide and vinyl esters such as vinyl acetate.

Conventionally, if the continuous polymer matrix phase is a copolymer, it is often prepared from at least one monovinylidene aromatic and at least one unsaturated nitrile. Preferred of the unsaturated nitriles is acrylonitrile. In preparing the copolymer matrix, the amounts of the monovinylidene aromatic compound(s) and unsaturated nitrile(s) most advantageously employed will vary depending on the physical and chemical properties desired in the final rubber-reinforced polymer. In general, the copolymer matrix will advantageously comprise from 5 to 35, preferably 15 to 25, weight percent of the unsaturated nitrile(s) and from 95 to 65, preferably from 85 to 75, weight percent of the monovinylidene aromatic compounds(s), said weight percents being based on the total amount of the monovinylidene aromatic compound and unsaturated nitrile.

If employed, any comonomers other than an unsaturated nitrile will generally be employed in amounts less than 10, more generally less than 5, weight percent based on the total weight of the monomers employed in preparing the continuous polymer matrix phase of the rubber-reinforced styrenic polymer.

Rubbers useful in preparing the rubber-reinforced styrenic polymer resin are well known in the art and reference is made thereto for the purposes of this invention. Advantageously, the rubber employed in preparing the rubber-reinforced polymer resin is a homopolymer or a copolymer of an alkadiene which exhibits a second order transition temperature not higher than 0° C. and preferably not higher than −20° C. as determined by conventional methods, e.g., ASTM Test Method D-746-52T. A copolymer of ethylene, propylene and optionally, a non-conjugated diene can also be employed. Preferably, the rubber is a homopolymer of a 1,1-conjugated diene such as butadiene, isoprene, piperylene, chloroprene or a copolymer of said conjugated dienes with a comonomer such as a monovinylidene aromatic compound such as styrene (which is commonly chemically bonded in blocks or grafted branches to the alkadiene polymer); an α,β-ethylenically unsaturated nitrile such as acrylonitrile or an α-olefin such as ethylene or propylene. For the purposes of this invention, a copolymer of an alkadiene and other polymerized comonomer (e.g., a monovinylidene aromatic and/or unsaturated nitrile), only the polymerized alkadiene is considered to be rubber and any blocks or grafted branches of the other polymerized monomers are not considered to be rubber but polymer bonded to rubber. Although the rubber may contain a small amount of a cross-linking agent such as divinyl benzene, excessive cross-linking can result in a loss of the rubbery characteristics of the rubber.

Preferred rubbery polymers are homopolymers of 1,3-butadiene and block or graft copolymers of at least 55, more preferably from 65 to 85, weight percent of 1,3-butadiene and up to 45, more preferably from 15 to 35, weight percent of a monovinylidene aromatic compound, preferably styrene. The rubber is advantageously employed in an amount such that the rubber-reinforced polymer contains from 3 to 20 weight percent rubber. A rubber-reinforced polymer having from 5 to 15 weight percent rubber based on the total weight of the rubber-reinforced polymer is preferred.

In the preparation of the rubber-reinforced polymer, the dispersed rubber particles are prepared at a particle size which imparts the desired properties to the polymer matrix. Although this will vary depending on the method by which the rubber-reinforced polymer is prepared, in general, the rubber particles reinforcing the continuous polymer matrix phase will generally exhibit a volume average particle size from 0.1 to 20 micrometer. Advantageously, the rubber particles will exhibit a volume average particle size from 0.6 to 10 micrometers, preferably from 0.8 to 5 micrometers.

Methods for the preparation of rubber-reinforced styrenic polymers are well known in the art and reference is made thereto for the purposes of the present invention. Representative of such methods include the mass polymerization techniques such as described in U.S. Pat. Nos. 2,727,884; 3,243,841; 3,488,744 and 3,903,202; a combination of mass and suspension polymerization techniques and the so-called "emulsion polymerization techniques" wherein the rubber particles are prepared using emulsion polymerization such as described in U.S. Pat. Nos. 3,509,238 and 3,751,526.

In general, mass or mass/suspension polymerization techniques are most commonly employed in the preparation of rubber-reinforced polystyrene, whereas both mass as well as emulsion polymerization techniques are conventionally employed in the preparation of ABS.

The aliphatic diesters employed in the practice of the present invention are represented by the general structural formula:

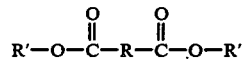

wherein R is a covalent bond or an alkyl group having from 1 to 8 carbon atoms and each R' is individually an alkyl group having from 2 to 18 carbon atoms. Advantageously, R is an alkyl group having from 2 to 6 carbon atoms and each R' is individually a branched or straight chain alkyl group having from 2 to 12, preferably from 6 to 10, carbon atoms. More preferably, R is an alkyl group of 4 carbon atoms and each R' is individually a branched or straight chain alkyl group of 8 carbon atoms. Most preferably, the aliphatic diester employed in the practice of the present invention is dioctyl adipate (DOA) also referred to as di-(2-ethylhexyl) adipate.

The aliphatic diester is employed in an amount sufficient to increase the elongation of the rubber-reinforced styrenic polymer. In general, the aliphatic diester is advantageously employed in an amount sufficient to double the elongation of the rubber-reinforced styrenic polymer at a pulling speed of 50 mm/min. For the purposes of this invention, elongation is the elongation at break expressed as a percentage of the original elongation measured using the test method of ASTM-D-638 on samples which were injection molded at a melt temperature of 250° C.

The specific amounts required to give the desired increases in elongation are dependent on the specific aliphatic diester and rubber-reinforced styrenic polymer employed. In general, the aliphatic diester is employed in an amount of at least 0.1, preferably at least 0.2, weight percent based on the total weight of the rubber-reinforced styrenic polymer resin to achieve the desired increases in elongation. More preferably, the aliphatic diester is employed in an amount of at least 0.3 weight percent based on the total weight of the rubber-reinforced styrenic polymer resin.

It has generally been found that the elongation of the rubber-reinforced polymer increases as the concentration of the aliphatic diester increases until the concentration of the aliphatic diester reaches some concentration, at which point, no further or only marginal increases in the elongation in the rubber-reinforced styrenic polymer are experienced with further increases in the concentration of the aliphatic diester. Moreover, as the amounts of the aliphatic diester increase, the high temperature properties of the rubber-reinforced polymer decrease. Therefore, once the desirable elongation has been achieved, there is generally no advantage in continuing to increase the amounts of aliphatic diester in the blend. In general, the maximum amounts of the aliphatic diester employed will be less than 1 weight percent based on the total weight of the rubber-reinforced styrenic polymer resin. More preferably, the aliphatic diester will be employed in an amount of less than 0.75 weight percent. Most preferably, the aliphatic diester is employed in an amount from 0.3 to 0.6 weight percent based on the total weight of the rubber-reinforced styrenic polymer resin.

In preparing the composition of the present invention, the rubber-reinforced styrenic polymer and the aliphatic diester are mixed at conditions sufficient to disperse the aliphatic diester throughout the rubber-reinforced styrenic polymer. A preferred method for dispersing the aliphatic diester throughout the polymer is melting blending the aliphatic diester in the rubber-reinforced polymer. The term "melt blending" is used conventionally herein and refers generally to blending of the polymer with the aliphatic diester while the polymer is in a liquid or molten state. Preferably, the melt blending operation is advantageously conducted following complete polymerization and the removal of any unconverted monomer(s) and other volatiles from the polymerization mixture. In a mass or mass/suspension type production process, the melt blending can be conducted either prior or subsequent to final quenching and pelletizing of the rubber-reinforced styrenic polymer. If the rubber-reinforced polymer is to be employed in an injection molding operation, the rubber-reinforced polymer can be fed directly to the injection molding apparatus, heated to a molten condition, mixed with the aliphatic diester and thereafter molded into a desired shape and size.

Although the temperatures at which melt blending takes place are dependent on a variety of factors, including the specific polymer and the aliphatic diester employed, in general, melt blending is advantageously conducted at temperatures from 180° to 260° C. Preferably, the melt blending of the aliphatic diester and rubber-reinforced styrenic polymer is conducted at temperatures from 200° to 250° C.

The following examples are set forth to illustrate the advantages of the present invention and should not be construed to limit its scope. In the examples, all parts and percentages are by weight unless otherwise indicated.

For the purposes of the examples, tensile properties were measured using the test method of ASTM-D-638 on samples which were injection molded at a melt temperature of 250° C. The tensile yield is expressed in Newtons per square millimeter ($N/mm^2$) and the elongation is the elongation at break expressed as a percentage of the original length. The Vicat temperature, which is an indication of the softening point of the polymer, of the ABS type polymer was measured using the test methods described by DIN-53460/A. The impact strength is a notched Charpy impact strength expressed in Kilojoules per square meter ($Kj/m^2$) measured using the test method of DIN 53-453 on injection molded samples molded at a mold temperature of 50° C. and a melt temperature of 250° C.

EXAMPLE 1

An ABS type rubber-reinforced styrenic polymer is prepared using mass polymerization techniques such as described by European Patent Application No. 82.201 156.5. The polymerization takes place in the presence of a free-radical initiator and an antioxidant. In addition, 26 weight percent of ethylbenzene as an organic liquid reaction diluent is employed in the polymerization. The resulting ABS type polymer comprises a continuous copolymer phase consisting of 78 percent of polymerized styrene and 22 percent of polymerized acrylonitrile. Dispersed throughout the continuous copolymer matrix are discrete rubber particles of a polybutadiene rubber having a volume average particle size of 1 micron. The dispersed polybutadiene rubber particles comprise 10.5 weight percent of the ABS type polymer and the copolymer phase comprises 89.5 weight percent of the ABS type polymer.

The resulting ABS type polymer, in pellet form, was mechanically mixed, at room temperature, with dioctyl adipate. The dioctyl adipate was employed in an amount of 0.4 percent based on the total weight of the ABS type polymer. The mixture was then injection molded using a melt temperature of 250° C. The Vicat of the resulting injection molded product was measured to be 105.9° C.

The tensile properties of the resulting blend of the ABS type polymer and dioctyl adipate were measured at different pulling speeds and are set forth in Table I.

COMPARATIVE EXAMPLE A

For purposes of comparison, the tensile properties of the ABS type polymer of Example 1 containing no dioctyl adipate were also measured and are also set forth in Table I. The Vicat of this ABS containing no dioctyl adipate was measured to be 107.3° C.

TABLE I

|  | Pulling Speed | | | |
| --- | --- | --- | --- | --- |
|  | 5 mm/ min | 20 mm/ min | 50 mm/ min | 100 mm/ min |
| Example 1 (ABS plus 0.4% | | | | |

TABLE I-continued

| | Pulling Speed | | | |
|---|---|---|---|---|
| | 5 mm/min | 20 mm/min | 50 mm/min | 100 mm/min |
| Dioctyl Adipate) | | | | |
| Tensile Yield, N/mm$^2$ | 38 | 41 | 42 | 44 |
| Elongation, % | 73 | 72 | 60 | 55 |
| Comparative Example A (ABS with no added Dioctyl adipate) | | | | |
| Tensile Yield, N/mm$^2$ | 44 | 46 | 48 | 48 |
| Elongation, % | 39 | 20 | 17 | 16 |

As evidenced by the data set forth in Table I, the composition of the present invention which is a blend of the ABS type polymer and 0.4 percent dioctyl adipate exhibits significantly increased elongation than the ABS type polymer containing no dioctyl adipate. This increased elongation is exhibited at pulling speeds from 5 mm/min to a 100 mm/min. In addition, as evidenced by the data in Table I, the differences in elongation between the ABS type resin containing the dioctyl adipate and that polymer which does not contain the dioctyl adipate become relatively greater as the pulling speed at which the elongation is measured is increased. Similar results are obtained with an ABS type polymer prepared using the techniques of Example 1 except that the resulting ABS type polymer contains 12.5 percent of a butadiene rubber dispersed as discrete particles having a volume average particle size of 1.2 micron and 87.5 weight percent of a continuous copolymer matrix phase of 78 percent styrene and 22 percent acrylonitrile.

EXAMPLE 2

An ABS type polymer was prepared using mass polymerization techniques identical to those of Example 1 except that the polymerization mixture also contained 0.3 percent based on the total weight of the polymerization mixture of dioctyl phthalate and the final product comprised 11 percent of a polybutadiene rubber dispersed as discrete rubber particles having a volume average particle size of 0.6 micron and 89 percent of a continuous copolymer phase consisting of 78 percent polymerized styrene and 22 percent of polymerized acrylonitrile.

Using the techniques of Example 1, a composition of the present invention was prepared by melt blending a portion of the ABS type polymer with 0.4 percent of dioctyl adipate. The combination of the ABS type polymer and dioctyl adipate exhibited a Vicat of 103.9° C. The tensile properties of the resulting ABS type polymer/dioctyl adipate blend were measured at different pulling speeds and are set forth in Table II.

COMPARATIVE EXAMPLE B

For purposes of comparison, the properties of the ABS type polymer of Example 2 containing no dioctyl adipate were also measured at different pulling speeds and are set forth in Table II. The ABS type polymer exhibited a Vicat of 104.9° C.

TABLE II

| | Pulling Speed | | | |
|---|---|---|---|---|
| | 5 mm/min | 20 mm/min | 50 mm/min | 100 mm/min |
| Example 2 (ABS plus 0.4% Dioctyl Adipate) | | | | |
| Tensile Yield, N/mm$^2$ | 41 | 45 | 46 | 48 |
| Elongation, % | 68 | 64 | 49 | 46 |
| Comparative Example B (ABS with no added Dioctyl adipate) | | | | |
| Tensile Yield, N/mm$^2$ | 48 | 51 | 52 | 53 |
| Elongation, % | 14 | 11 | 11 | 10 |

As evidenced by the data set forth in Table II, the ABS type polymer containing the dioctyl adipate again exhibited significantly higher elongations at all puling speeds than an ABS polymer containing no dioctyl adipate. Although the ABS polymer was prepared in the presence of and contains dioctyl phthalate, the dioctyl phthalate was not found to significantly increase the elongation of the ABS polymer.

EXAMPLES 3-6

An ABS polymer identical to that of Example 2 was prepared. Portions of the resulting ABS polymer were melt blended with 1.6 percent, based on the total weight of ABS type polymer, of a color concentrate and various concentrations of dioctyl adipate as set forth in the accompanying Table III.

The tensile properties, at a pulling speed of 100 mm/min, Vicat and impact strength of each of the resulting melt blended compositions were evaluated. The measured properties are set forth in Table III.

COMPARATIVE EXAMPLE C

For purposes of comparison, the tensile properties, Vicat and impact strength of the ABS type polymer of Examples 3-6 not blended with dioctyl adipate were also measured and are also presented in Table III.

TABLE III

| | Example 3 | Example 4 | Example 5 | Example 6 | Comparative Example C |
|---|---|---|---|---|---|
| Composition | | | | | |
| ABS Polymer, Weight % | 99.7 | 99.6 | 99.5 | 99.4 | 100 |
| Dioctyl Adipate, Weight % | 0.3 | 0.4 | 0.5 | 0.6 | — |
| Tensile Properties | | | | | |
| Tensile Yield, N/mm$^2$ | 48 | 46 | 45 | 44 | 51 |
| Elongation, % | 17 | 44 | 41 | 40 | 8 |
| Notched Charpy Impact | | | | | |
| Kj/m$^2$ | 8.5 | 8.6 | 8.7 | 8.7 | 8.5 |
| Vicat, °C. | 104.7 | 104.3 | 103.8 | 103.3 | 105.6 |

As evidenced by the data in the foregoing Table III, the elongation of a melt blended ABS polymer containing from 0.3 to 0.6 weight percent of a dioctyl adipate is significantly increased when compared to the ABS polymer containing no dioctyl adipate. The most significant increase in elongation is seen when the concentration of dioctyl adipate is increased from 0.3 to 0.4 weight percent. Above this concentration, further improvements in elongation are negligable. In addition, the notched Charpy impact strength of the melt blended compositions are equivalent to the ABS polymer containing no dioctyl adipate.

EXAMPLE 7

A rubber-reinforced polystyrene is prepared using conventional mass polymerization techniques. The rubber-reinforced polystyrene contains 94.5 percent of a continuous matrix phase of polymerized styrene and 5.5 percent of a butadiene rubber dispersed as discrete rubber particles throughout the continuous polymer matrix at a particle size of 4 micron. A portion of the resulting rubber-reinforced polystyrene is blended with 0.4 weight percent of dioctyl adipate. The tensile properties of the resulting melt blended composition, at various pulling speeds, were measured and are set forth in Table IV.

COMPARATIVE EXAMPLE D

For purposes of comparison, the tensile properties of the rubber-reinforced polystyrene containing no dioctyl adipate were also measured at different pulling speeds and are also set forth in Table IV.

TABLE IV

|  | Pulling Speed | | | |
| --- | --- | --- | --- | --- |
|  | 5 mm/min | 20 mm/min | 50 mm/min | 100 mm/min |
| Example 7 (ABS plus 0.4% Dioctyl Adipate) | | | | |
| Tensile Yield, N/mm² | 28 | 29 | 29 | 31 |
| Elongation, % | 58 | 48 | 55 | 50 |
| Comparative Example D (ABS with no added Dioctyl adipate) | | | | |
| Tensile Yield, N/mm² | 29 | 32 | 32 | 32 |
| Elongation, % | 44 | 37 | 26 | 22 |

As evidenced by the data in Table IV, the rubber-reinforced polystyrene containing the dioctyl adipate exhibited greater elongations than the rubber-reinforced polystyrene containing no dioctyl adipate. Although the increases in elongation are not as significant as with an ABS type polymer (particularly at lower pulling speeds) the differences are significant, particularly at the higher pulling speeds of 50 and 100 mm/min.

Similar results were obtained when 0.5 weight percent of the dioctyl adipate were blended with the rubber-reinforced polystyrene.

What is claimed is:

1. A composition comprising a rubber-reinforced styrenic polymer and an amount less than 0.75 weight percent of an alipatic diester represented by the general structural formula:

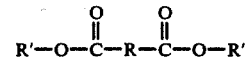

wherein R is a covalent bond or an alkylene group of from 1 to 8 carbon atoms and each R' is an alkyl group of from 2 to 18 carbon atoms, the amount of said aliphatic diester being sufficient to increase the elongation of the rubber-reinforced styrenic polymer.

2. The composition of claim 1 wherein R is an alkyl group having from 2 to 6 carbon atoms and each R' is individually a branched or straight chain alkyl group having from 2 to 12 carbon atoms.

3. The composition of claim 2 wherein R is an alkylene group of 4 carbon atoms and each R' is individually a branched or straight chain alkyl group of 8 carbon atoms.

4. The composition of claim 3 wherein the aliphatic diester is dioctyl adipate.

5. The composition of claim 3 or 4 wherein the aliphatic diester is employed in an amount from 0.1 to 1 weight percent based on the total weight of the rubber-reinforced styrenic polymer resin.

6. The composition of claim 3 or 4 wherein the aliphatic diester is employed in an amount from 0.3 to 0.6 weight percent based on the total weight of the rubber-reinforced styrenic polymer resin.

7. The composition of claim 4 wherein the rubber-reinforced styrenic polymer resin is a rubber-reinforced polymer of one or more monovinylidene aromatic compounds or a copolymer of one or more monovinylidene aromatic compound(s) and an unsaturated nitrile or an ester of an a,b-ethylenically unsaturated carboxylic acid.

8. The composition of claim 7 wherein the rubber-reinforced styrenic polymer resin is a rubber-reinforced polymer of styrene or a copolymer of styrene and a-methylstyrene.

9. The composition of claim 7 wherein the rubber-reinforced styrenic polymer resin is a rubber-reinforced copolymer of styrene and acrylonitrile.

10. The composition of claim 8 or 9 wherein the rubber is a homopolymer of 1,3-butadiene or a block or graft copolymer derived from 65 to 85 weight percent of 1,3-butadiene and from 15 to 35 weight percent of a monovinylidene aromatic compound.

11. A method for preparing the composition of claim 1 comprising the step of mixing the styrenic polymer and the aliphatic diester at conditions to disperse the aliphatic diester throughout the polymer.

12. The method of claim 11 wherein the method comprises mixing the styrenic polymer with the aliphatic diester while the polymer is in a liquid or molten state.

* * * * *